(12) United States Patent
Solton et al.

(10) Patent No.: US 10,819,784 B1
(45) Date of Patent: Oct. 27, 2020

(54) API MEDIATION FOR ONLINE SERVICES

(71) Applicant: The Bank of New York Mellon, New York, NY (US)

(72) Inventors: Randy T. Solton, Berkeley, CA (US); Lizbeth B. Stevenson, Oakland, CA (US)

(73) Assignee: The Bank of New York Mellon, New York, NY (US)

( * ) Notice: Subject to any disclaimer, the term of this patent is extended or adjusted under 35 U.S.C. 154(b) by 659 days.

(21) Appl. No.: 15/474,924

(22) Filed: Mar. 30, 2017

Related U.S. Application Data

(60) Provisional application No. 62/315,608, filed on Mar. 30, 2016.

(51) Int. Cl.
*H04L 29/08* (2006.01)
*H04L 29/06* (2006.01)

(52) U.S. Cl.
CPC .......... *H04L 67/1095* (2013.01); *H04L 67/02* (2013.01); *H04L 69/03* (2013.01)

(58) Field of Classification Search
None
See application file for complete search history.

(56) References Cited

U.S. PATENT DOCUMENTS

| | | | | |
|---|---|---|---|---|
| 2002/0038340 A1* | 3/2002 | Whipple | ............... | G06F 9/465 709/203 |
| 2012/0173679 A1* | 7/2012 | Li | ................... | H04L 67/2823 709/220 |
| 2013/0205305 A1* | 8/2013 | Lv | ...................... | H04W 4/00 719/313 |
| 2013/0325733 A1* | 12/2013 | Wu | ..................... | G06Q 50/01 705/319 |
| 2015/0127729 A1* | 5/2015 | Madhavan | ......... | G06F 16/9535 709/204 |

* cited by examiner

*Primary Examiner* — William G Trost, IV
*Assistant Examiner* — Christopher P Cadorna
(74) *Attorney, Agent, or Firm* — Fenwick & West LLP

(57) ABSTRACT

An API mediation system can allow an original service designed to interact with client systems over a first API to interact with other client systems over a second API without significant modifications to the original service. The API mediation system can automatically generate a mediation layer designed to translate communications to and from the original service between the first and second APIs. Similarly, the API mediation system can implement a mapping between functions of the original service through the first API and equivalent functions over the second API, including mapping security operations or other security methods between the first and second APIs. To generate the mapping layer, the API mediation system can generate a model of the original service outlining the underlying functionality of the original service.

14 Claims, 5 Drawing Sheets

API MEDIATION FOR ONLINE SERVICES

CROSS REFERENCE TO RELATED APPLICATION

This application claims benefit of provisional U.S. Application No. 62/315,608, filed Mar. 30, 2016, which is incorporated herein by reference in its entirety.

FIELD OF DISCLOSURE

The present invention generally relates to online services, and more specifically to ways of accessing an online service through an application programming interface (API).

BACKGROUND

Presently, many entities make online services available to their users. Online services allow users of the online service to interact with the entity, for example allowing a user of the online service to access data stored or generated by the entity. For example, an online service can be a weather service allowing a user to access weather data gathered by the entity. Similarly, an online service can be an online email service allowing a user of the service to check received messages to and transmit messages to be sent from their accounts.

When created, an online service can provide an application programming interface (API) using an original protocol for interacting with the online service. Users of the online service interact with the online service over the API of the original protocol. The original protocol can be chosen based on popularity and suitability at the time of the service's creation to maximize the number of users able to interact with the service. The online service then operates using the original protocol API.

Eventually, for example after several years of operation, the original protocol may have become obsolete or less supported by new users or user devices. Users and user devices may instead use an alternative protocol, for example a newer, more secure, or easier to implement protocol. Therefore, the online service may be adapted to use the alternative protocol. However, often there are still legacy users regularly interacting with the original service over the original protocol, thus, the original service cannot simply be discontinued or functionality for the original protocol removed without impacting these legacy users. Similarly, manually implementing a parallel service with the same functionality to use the alternative protocol is redundant and inefficient. Therefore there is a need for a system to adapt an existing online service to receive instructions over an alternative protocol without preventing the online service from continuing to operate over the original protocol.

SUMMARY

An API mediation system can allow an original service designed to interact with client systems over a first API to interact with other client systems over a second API without significant modifications to the original service. The API mediation system can automatically generate a mediation layer designed to translate communications to and from the original service between the first and second APIs. Similarly, the API mediation system can implement a mapping between functions of the original service through the first API and equivalent functions of the original system over the second API. For example, an instruction in the Simple Object Access Protocol (SOAP) protocol can be translated to a corresponding instruction using REpresentational State Transfer (REST). Thus, though the original service may have been designed to use the first API, the mediation system permits translation from the second API to the first API such that clients may additionally use the second API to interact with the original service, without the original service being significantly modified to accommodate the second API. To generate the mapping layer, the API mediation system can generate a model of the original service outlining the underlying functionality of the original service. For example, the API mediation system can determine the functionality of the original service by analyzing and categorizing instruction and response types the original service can send and receive over the original API. Then, the API mediation system can generate equivalent communication formats compatible with the second API.

The API mediation system can additionally incorporate security mediation when translating operations between the first and second APIs. For example, the API mediation system can use a mapping between security methods (such as mapping between two different security headers of different formats, but requiring similar information).

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
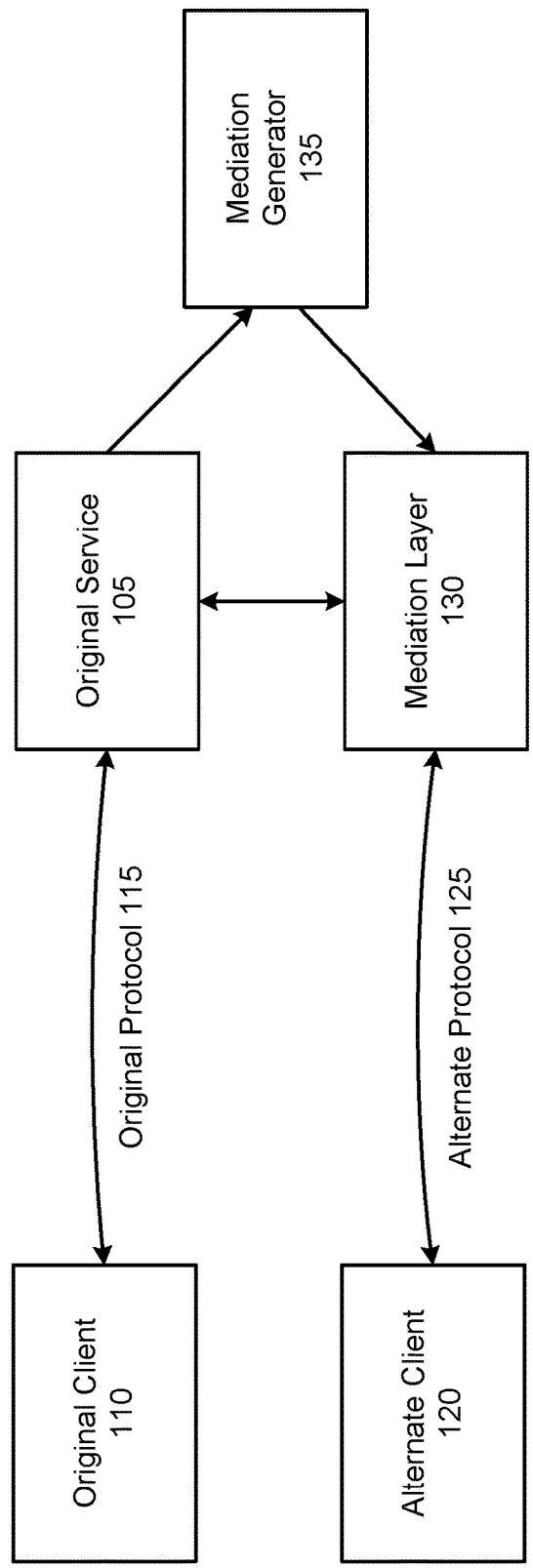
FIG. 1 is a high-level block diagram illustrating an embodiment of an environment in which a mediation generator operates.

FIG. 1 is a high-level block diagram illustrating an embodiment of an environment in which a mediation generator 135 operates. The environment 100 includes an original service 105 and an original client 110 that interacts with the original service using an original protocol 115. The environment further includes an alternate client 120 that interacts with the original service 105 through a mediation layer 130 using an alternate protocol 125. A mediation generator 135 creates the mediation layer 130. Here, only one of each entity are shown in FIG. 1 in order to simplify and clarify the description. There may be multiple instances of these entities in some embodiments. For example, there may be many original and alternate clients interacting with the original service, as well as multiple original services, 105, mediation layers 130, and mediation generators 135. The entities illustrated in FIG. 1 communicate via a computer network, such as the Internet, a Local Area Network (LAN), or a mobile device wireless network.

The original client 110 is a computing device such as a mobile phone, smart phone, web server, personal computer, or tablet computer. The original client 110 may execute one or more applications or other forms of computer-executable modules. Such applications provide services to a user of the original client 110. For example, the applications may provide information and provide tools for operating aspects of an enterprise such as a business. While providing these services, the original client 110 interacts with the original service 105 by, for example, requesting data from or sending instructions to the original service. For example, the original client 110 may request a user's received emails from the original service 105 or notify the original service of an email message sent by the user.

The original service 105 is an online service that interacts with clients, both original 110 and alternate 120, using the original protocol 115. For example, the original service may provide information to a client, perform actions on behalf of the client or based on instruction from a client, or perform other suitable services such as providing weather data, sports scores, or email services. The original service 105 may be provided by one or more computer systems, such as dedicated computer systems or a cloud computing environment.

In one embodiment, the original service 105 is comprised of a set of operations (hereinafter "original operations") that perform the functions of the original service 105. These operations collectively describe an application programming interface (API) supported by the original service 105. Each original operation has an associated name and list of expected input and output data sent to and from the original client 110 and the original service 105 when the original operation is performed. For example, a web service providing weather data can have an original operation named "getTodayForecast" with an expected input of location data and an expected output of the expected weather conditions at that location for the current day.

The original service 105 is associated with documentation or other files, for example a Web Services Description Language (WSDL) file or an XML Schema Definition (XSD) file that describe the functionality of the original service 105. For example, a WSDL file may list all of original operations supported by the original service 105 as well as the inputs and outputs associated with the operations. In some embodiments, the associated documents or files can also describe the data types of the associated inputs and outputs. For example, an "expected weather" output can be of a data type with component data types "temperature" and "chance of rain."

The original protocol 115 is a software protocol outlining a method of interacting with the original service 105. For example, a protocol can define a specific syntax and/or grammar for transmitting instructions or other relevant information between devices connected through a network or other communication interface. Similarly, a protocol can be an architectural style outlining formatting guidelines and/or methods for transmitting messages over a network. In one embodiment, the original protocol 115 is the protocol natively-supported by the original service 105. Thus, when the original client 110 interacts with the original service 105 using the original protocol 115, the original client 110 is using the native protocol supported by the original service 105. In one embodiment, the original protocol 115 is the Simple Object Access Protocol (SOAP). In other embodiments, the original protocol can be the JavaScript Object Notation (JSON)-Remote Procedure Call (RPC), JSON-Web-Service Protocol (WSP), Extensible Markup Language (XML)-RPC, and the like.

Similar to the original client 110, the alternate client 120 is also a computing device which may execute one or more applications that provide services to a user. The alternate client 120 interacts with the original service 105 via the mediation layer 130 using the alternate protocol 125. The alternate protocol 125 is different than the original protocol 115 and not natively compatible with the original service 105. For example, a client using the alternate protocol 125 can transfer information in a different format than the original protocol 115, such that the original service 105 expecting information over the original protocol 115 would not be able to correctly interpret a message or other information sent over the alternate protocol 125. Similarly, a client using the alternate protocol 125 can transfer different information than transferred when using the original protocol 115, for example transmitting only changes to a data object when the original service 105 would normally expect a complete updated data object. In one embodiment, the alternate protocol 125 is the REpresentational State Transfer (REST) architectural style.

The mediation layer 130 is an intermediate entity between the alternate client 120 and the original service 105. For example, the mediation layer 130 can be a server configured to communicate with both the alternate client 120 and the original service 105. In one embodiment, the mediation layer 130 translates or otherwise converts between the alternate protocol 125 used by the alternate client 120 and the original protocol 115 used by the original service 105. For example, the mediation layer 130 can receive instructions such as a request described in the alternate protocol 125 and in response submit an equivalent request described in the original protocol 115 to the original service 105. The mediation layer 130 thus allows the alternate client 120 to provide services from the original service 105.

In some embodiments, the mediation layer 130 is configured to allow the alternate client 120 access to all or some of the original operations of the original service 105 through the alternate protocol 125. For example, the mediation layer 130 can contain a mapping between each original operation, type of message, or message format used to access functionality of the original service 105 using the original protocol 115 with a corresponding alternate operation, message or message format in the alternate protocol 125. In some embodiments or for certain operations within an embodiment, the mapping can be a one-to-one mapping in which a certain message or original operation in the original protocol 115 corresponds to a differently formatted, but otherwise equivalent alternate operation or message in the alternate protocol 125. In other configurations, one message in the original protocol 115 can be mapped to multiple messages in the alternate protocol 125 or the functionality of a certain message in the original protocol 115 can be split or distributed over multiple messages in the alternate protocol 125.

In embodiments where the original service 105 requires authentication or another form of security, the mediation layer 130 can appropriately mediate the security methods used in the original protocol 115 and the alternate protocol 125. For example, in an embodiment where username and password authentication is required in the original service 105, the mediation layer can appropriately and securely collect username and password data from the alternate client 120 over the alternate protocol 125 and transmit the username and password information to the original service 105. Security mediation can be achieved through several mapping methods. For example, security mediation can be based on literal values or other values extracted from messages in the alternate protocol 125. These values can be mapped to appropriate fields or locations within messages of the original protocol 115, for example, a SOAP security header can be mapped to a HTTP basic authorization header. For example, the operations of an original service can include one or more security operations requiring security mediation. In some embodiments, the mediation layer 130 can utilize extracted values from messages in the alternate protocol 125 to perform a user lookup within an identity store storing appropriate security information for users of the original service 105. The mediation layer 130 can then transmit appropriate security information based on the user lookup to the original service 105. In some implementations, a security mediation mapping is a two way mapping that enables secure messaging both to and from the original service 105 to the alternate client 120. For example, security mediation can be applied to messages over the original protocol 115 as they are translated into the alternate protocol 125 by the mediation layer 130.

The mediation generator 135 creates the mediation layer 130 using information about the original service 105. In one embodiment, the mediation generator 135 receives information about the functions of the original service 105, for example, an WSDL file describing the original service 105. Using this information, the mediation generator 135 generates a mapping to alternate operations and use the generated mapping to generate code to implement the mediation layer 130. In some embodiments, the mediation generator 135 can present the generated mapping to a user (such as an administrator of the mediation layer 130) for review and editing. For example, the mediation generator 135 can generate mediation code for a mediation layer 130 to enable an original service 105 using SOAP as an original protocol 115 to communicate with an alternate client 120 using REST as the alternate protocol 125.

The mediation generator 135 thus generates mediation layers, such as the mediation layer 130 shown in FIG. 1, that allow clients to interact with services using non-native service protocols. For example, the alternate client 120 can use the REST protocol to interact with the original service 105, even though the original service 105 does not natively support REST and instead supports SOAP. This way, legacy services, such as those provided by the original service 105, can be accessed by alternate clients 120 that use different, and perhaps newer, protocols. Such mediation is particularly useful in enterprise environments where there are a large number of legacy services that must be accessed by both older and newer clients.

Figure 2:
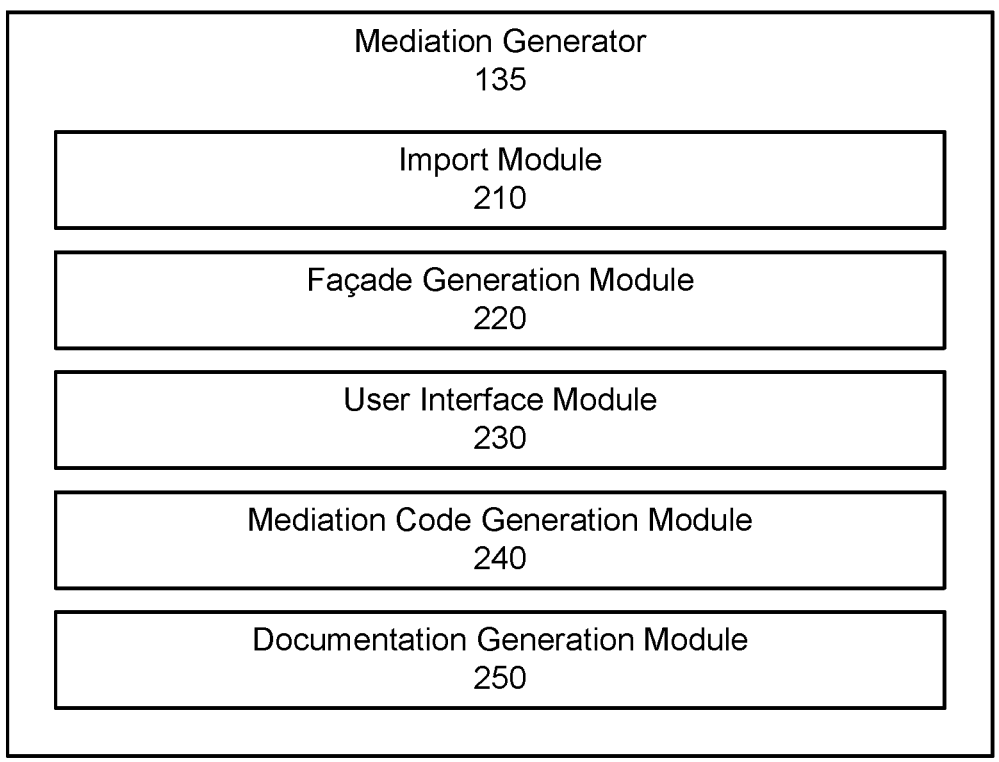
FIG. 2 is a block diagram illustrating a detailed view of a mediation generator, according to one embodiment.

FIG. 2 is a block diagram illustrating a detailed view of a mediation generator 135, according to one embodiment. The mediation generator 135 includes an import module 210, a façade generation module 220, a user interface module 230, a mediation code generation module 240, and a document generation module 250.

The import module 210 imports information about the functionality of the original service 105 and generates a model of the original service 105 for later analysis. For example, the import module 210 can utilize one or more WSDL files describing messages and expected responses to and from the original service 105 and an original client 105 to generate the model of the original service 105. In some implementations, the import module 210 can also utilize XSD files to generate the model.

For example, each original operation of the original service 105 can be represented as one or more messages to and from the original service 105, each message consisting of one or more data items. A message, for example, can be a request for historical weather data from an example original service 105 allowing access to a database of meteorological data. A data item can be a parameter, data package or other piece of information of a base or complex data type. In some embodiments, data items are each associated with a name identifying the parameter or data item. The request for historical weather data message can have a message type or name indicating the purpose of the message, for example a "get historical data" type message, and can include multiple data items instructing the example original service 105 on which weather data is being requested. For example, the "get historical data" original operation can include a "location" data item giving information about the location of the requested data.

Each of the data items used by the original operation can be of a complex type comprising other data types, such as a "location" parameter containing "requested year" and "requested city" data items. Data items can also be of a base or primitive data type, for example the "requested year" data item can be of the integer primitive type, and directly contain an integer giving a year of the requested data. This information can be contained in the definition file, such as the WSDL file, which can be analyzed by the import module 210 to determine a model for the original service 105. A model can describe the functionality of the original service 105, for example by relating the original operations and operations names to the base level input data to the original service and output data from the original service.

In one embodiment, the import module 210 generates a tree model for each function of the original service 105. A tree model can be a nested tree of each input comprising multiple levels with nodes to represent data items or the operation. For example, the first (root) level of a tree model for an original operation can be the operation name, and the second level of the tree can include a branch for each input or output data item in the operation. In some embodiments, data items are complex, or made out of other data items, and these sub data items can be represented in corresponding branches off of the parent data items. Each branch of the tree can terminate in a data item of a primitive type, that is, a data item containing no data items within it. A tree model for an example original operation can include a root node associated with the original operation name with two branches, an input branch comprising a data item of an integer primitive type, and an output branch comprising a data item of a Boolean primitive type.

In one implementation, the tree model is obtained from a set of WSDL and XSD files describing data type definitions and the structure of input and output messages for each original operation. The import module 210 analyzes the WSDL file containing definitions of functions or original operations of the original service 105 and determines the highest level data items associated with that original service 105. The import module 210 then finds the definitions of the highest level data items in the set of WSDL and XSD files to determine their component data items (if any). In some implementations, this process is repeated until the full tree model is generated.

In some implementations, the import module 210 also generates a flattened model for each function of the original service 105. A flattened model for each original operation can associate each original operation with the base or primitive data types input or output by the original operation. In some embodiment, a flattened model can be obtained by collapsing a tree model and associating the original operation directly with the primitive types. In some embodiments, the import module 210 generates both a tree model and a flattened model for the original service 105.

The façade generation module 220 analyzes the tree view model and the flattened model to determine a mapping between the original service 105 and an equivalent alternate service using the alternate protocol 125. For example, the façade generation module 220 can analyze the names of operations in the original service 105 to determine their functions and appropriately replicate those functions using the alternate protocol 125. The mapping between the original service and an equivalent alternate service using the alternate protocol 125 can then be further refined by other modules of the mediation generator 130. The façade generation module 220 is discussed in greater detail in relation to FIG. 3.

In some embodiments, the user interface module 230 provides a user interface allowing a user of the mediation generator 130 (e.g., a user of an alternate client 120) to modify or refine the mapping generated by the façade generation module 220. The user interface module 230 can interface with a user directly or through a network to allow the user to modify the mapping generated by the façade generation module 220. For example, the user interface module 230 can provide a user interface allowing a user to include or exclude certain original operations from the mapping, altering the set of functions that will be available in the alternate service through the mediation layer 130. The user interface module 230 can also allow a user to modify the mapping itself, for example by changing the names of the alternate operations or by editing the functionality or parameters of the alternate operations. For example, the interface module 230 can enable a user to edit the naming scheme of the alternate operations, such as setting whether a dash or underscore is used to delineate the start of another word. The user interface module 230 can also enable the user to edit the IDs of parameters within the model and edit the names and assign categories to the operations in the alternate protocol.

The user interface module 230, according to some implementations, also allows the user to select options that the mediation code generation module 240 will follow (hereinafter, user selected options). For example, the user selected options can allow the user to select if documentation is generated for the mediation layer, to select a security mediation method, or to select other options, such as if an array output from the original service 105 will be paginated when passed to the alternate client 120.

In some embodiments, the user interface module 230 can employ machine learning methods to learn the preferences of a user in selecting the user selected options.

In some embodiments, the mediation code generation module 240 generates code for the mediation layer 130 based on a mapping between original and alternate operations generated by the façade generation module 220 and user selected options. In some embodiments, the mediation code generation module 240 also generates an API which can be used to access the alternate operations. In this example, the generated API (used with the alternate protocol 125) may provide alternate operations and expected inputs and outputs compared to the original operations of the original API. In alternatives, the provided API for the alternate protocol 125 may maintain the same operations as the original API but implement the API in the alternate protocol for the alternate client 120. In some embodiments, the mediation code generation module 240 implements the security mediation methods selected by the user selected options. According to some implementations, the mediation code generation module 240 also generates performance tests for each alternate operation. Embodiments can generate JMeter tests for each alternate operation or resource used in the alternate protocol, validate the response structure of each alternate operation, and capture response times for API calls associated with each alternate operation.

The document generation module 250 generates documentation for the mediated service. In some embodiments the document generation module 250 can generate documents based on the models generated by the import module 210. For example, in situations where the alternate protocol 125 uses REST, the document generation module 250 can automatically generate appropriate documentation to describe the mediated service, for example Swagger (OpenAPI) documentation describing an API used to access the mediated service.

Figure 3:
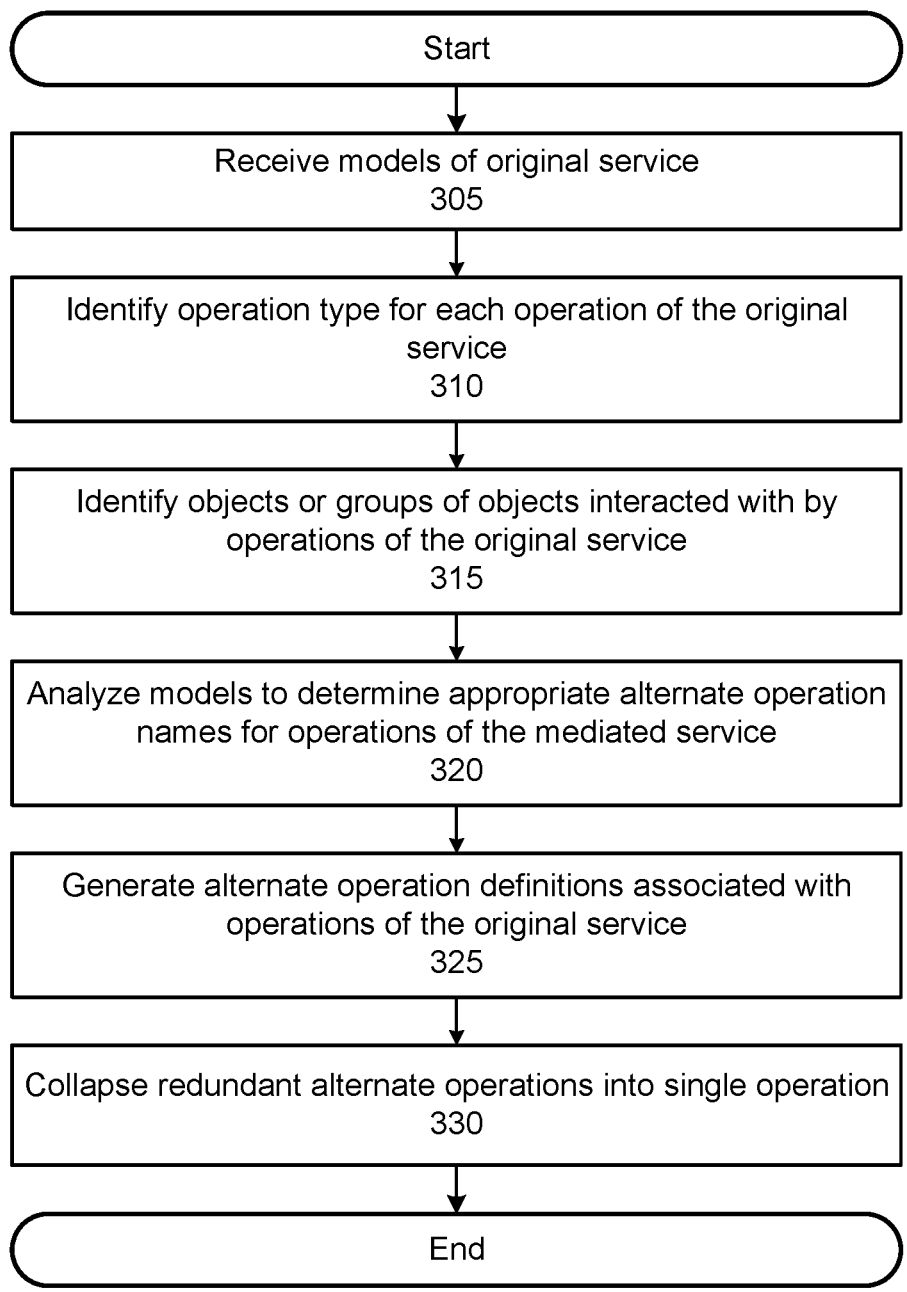
FIG. 3 is a flowchart illustrating a detailed process of generating a mediation layer, according to one embodiment.

FIG. 3 is a flowchart illustrating a detailed process of generating a mediation layer, according to one embodiment. The process 300 can occur at the façade generation module 220 and illustrates an example process for generating functions for a mediated service replicating the functions of the original service 105. The association between functions in the mediated service and functions in the original service 105 can be expressed as a mapping between the original operations of the original service 105 and the alternate operations of the mediated service.

The process 300 begins with receiving 305 models of the original service. For example, the received models can be tree models and/or flattened models for each original operation of the original service 105. Then, an operation type for each original operation is identified 310. In some embodiments, an operation type outlines the outcome of an operation, such as retrieving one or more data entries, adding new data entries to a database, deleting data entries, or updating already existing data entries. For example, REST operations or resources have associated HTTP methods used to access each REST resource based on the operation type, such as GET, PUT, POST and DELETE. In some embodiments, each original operation is analyzed to determine the appropriate operation type, and each original operation is associated with a corresponding HTTP method that will be used to access the equivalent REST resource.

According to some implementations the correct operation type is determined based on the original operation name. For example, the original operation name can be broken into subwords, and subwords of the operation name can be analyzed to determine a correct operation type. In one embodiment, each subword is compared to a list or dictionary of words or phrases each associated with an operation type. If a subword is found in the dictionary, the operation is assigned the operation type associated with the subword in the dictionary. For example, an original operation named "retrieveWeather" can be broken into subwords of "retrieve" and "weather" by the façade generation module 220. If the subword "retrieve" is associated with the operation type GET in a subword dictionary, the "retrieveWeather" operation can be associated with the GET operation type. In situations where no subwords of the image are found or subwords associated with multiple operation types are found, the operation can be assigned a default operation type or an operation type can be assigned based on a hierarchy of operation types.

As the process 300 continues, the data objects or groups of data objects which the original service 105 interacts with are identified 315. In some embodiments, pattern matching rules are applied to the operation name, operation type and the inputs and outputs of the original operation to determine the type and an appropriate name for the interacted data items. For example, for an original operation "get_Temperature" which has an input of a location and an output of a temperature, the façade generation module 220 can determine that the get_Temperature operation likely returns a specific temperature based on the location input. For example, based on the "get_Temperature" operation name as described above and the determined inputs and outputs of the operation. The received models are then analyzed 320 to determine an appropriate name for the operations of the mediated service. For example, the façade generation module 220 can remove subwords indicating the type of operation, check that the result is a noun, and pluralize the noun to determine the final operation name. For example, the "get_Temperature" original operation name would have the subword "get" removed (for example, because "get" is associated with the GET operation type) and the remaining subword "Temperature" would be pluralized to become "temperatures."

Then, alternate operation definitions are generated 325 for each original operation, for example based on the operation type, alternate operation name, and interacted objects associated with the original operation. In some embodiments, each alternate operation definition is also based on definition rules and conventions associated with the alternate protocol 125. The alternate operations are then analyzed to collapse 330 multiple redundant alternate operations into a single alternate operation. In some embodiments, differences in the structure and conventions of the original protocol 115 and the alternate protocol 125 can lead to multiple original operations being associated with alternate operations that are very similar or the same. The façade generation module 220 can detect these instances and associated one of the alternate operations with all appropriate original operations. This process can output with a mapping of original operations with alternate operation definitions including inputs, outputs, and names. In some embodiments, the output mapping is then presented to a user of the mediation generator for review and editing.

Figure 4:
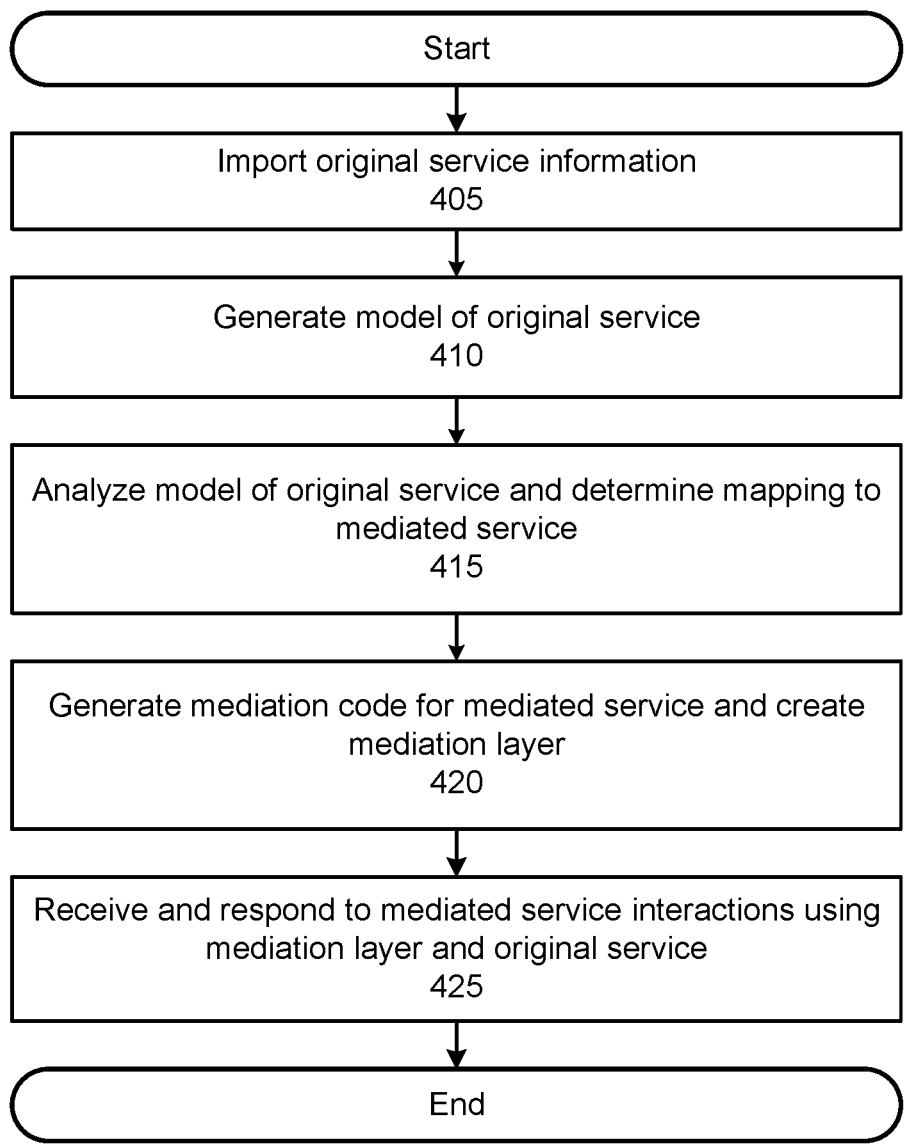
FIG. 4 is a flowchart illustrating a process of mediating an online service to an alternate API according to one embodiment.

FIG. 4 is a flowchart illustrating a process of mediating an online service to an alternate protocol according to one embodiment. The process 400 of FIG. 4 begins when the mediation generator imports 405 information about the original service. For example, the mediation generator can import definition files describing the functionality of the original service over the original protocol. Then a model of the original service is generated 410, such as a model describing the inputs and output data of each operation of the original service. The mediation generator then analyzes 415 the generated model and map the operations of the original service to equivalent operations in a mediated service using the alternate protocol. Code for actually performing the mediation is then generated 420 and used to create a mediation layer. At this point any received requests or other interactions with the mediated service can then be responded to 425 using the generated mediation layer and the original service.

Figure 5:
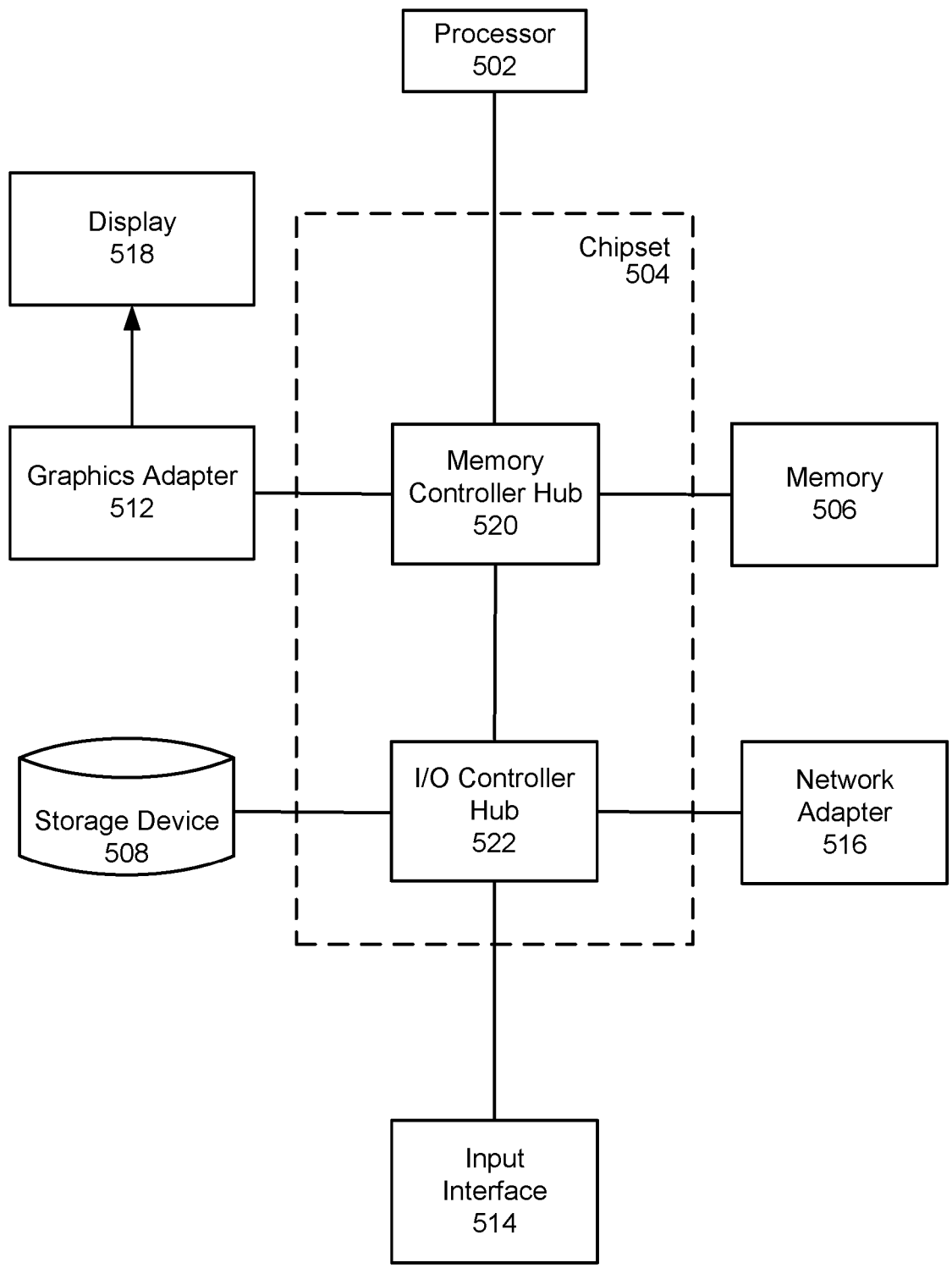
FIG. 5 is a high-level block diagram illustrating an example computer for implementing one or more of the entities shown in FIG. 1.

FIG. 5 is a high-level block diagram illustrating an example computer 500 for implementing one or more of the entities shown in FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. For example, the content server 120 can run in a single computer 500 or multiple computers 500 communicating with each other through a network such as in a server farm. The computers 500 can lack some of the components described above, such as graphics adapters 512, and displays 518.

OTHER CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method comprising:
   receiving a model for an original service comprising a plurality of original operations of the original service, each original operation comprising a name and a function, wherein the plurality of original operations comprises a security operation;
   identifying, for each original operation of the plurality of original operations, an operation type, wherein identifying an operation type for an original operation comprises:
      separating an original operation name associated with the original operation into one or more subwords;
      analyzing the one or more subwords; and
      identifying an operation type for the original operation based on at least one of the one or more subwords being associated with an operation type;
   identifying, for each original operation of the plurality of original operations, a set of objects with which the operation interacts;
   determining, based on the model, the identified operation types, and the identified objects with which the operations interact, a plurality of alternate operations, each alternate operation of the plurality of alternate operations corresponding to one or more original operations of the plurality of original operations, the plurality of alternate operations comprising an alternate security operation corresponding to the security operation, wherein each alternate operation is determined based on the identified type and set of objects associated with that original operation, and wherein each alternate operation comprises an alternate operation name and an alternate operation function; and
   generating, based on the plurality of original operations and the corresponding plurality of alternate operations, a mediation layer allowing instructions received through an alternate operation to be executed as an original operation, wherein the mediation layer comprises a two way mapping between the security operation and the alternate security operation, wherein the two way mapping includes a mapping of appropriate fields within a security header of the security operation to corresponding fields within a security header of the alternate security operation.

2. The method of claim 1, wherein an original operation comprises one or more inputs and one or more outputs and an alternate operation comprises one or more inputs, one or more outputs and an operation type.

3. The method of claim 2, wherein determining the plurality of alternate operations comprises:
   determining, for each original operation of the plurality of original operations, a corresponding alternate operation based on the operation type and the inputs and outputs of the original operation;
   detecting a plurality of the determined corresponding alternate operations comprising the same operation type and the same inputs and outputs; and
   consolidating the plurality of the determined corresponding alternate operations into a single alternate operation.

4. The method of claim 1, wherein the original service is associated with an original protocol outlining a method of interacting with the original service and the alternate service is associated with an alternate protocol distinct from the original protocol outlining a method of interacting with the alternate service.

5. The method of claim 4, wherein the original protocol is the Simple Object Access Protocol (SOAP) and the alternate protocol is the REpresentational State Transfer (REST) architectural style.

6. The method of claim 5, wherein the mediation layer comprises a mapping of values between a SOAP security header associated with the original protocol and a HTTP basic authorization header associated with the alternate protocol.

7. The method of claim 1, wherein the model for the original service comprises a tree model for each original operation of the original service and wherein the nodes of the tree model comprise nodes representing the operation name and inputs and outputs of the original operation.

8. A non-transitory computer readable storage medium comprising instructions, which when executed by a processor, cause the processor to perform the steps of:
   receiving a model for an original service comprising a plurality of original operations of the original service, each original operation comprising a name and a function, wherein the plurality of original operations comprises a security operation;
   identifying, for each original operation of the plurality of original operations, an operation type, wherein identifying an operation type for an original operation comprises:

separating an original operation name associated with the original operation into one or more subwords;

analyzing the one or more subwords; and identifying an operation type for the original operation based on at least one of the one or more subwords being associated with an operation type;

identifying, for each original operation of the plurality of original operations, a set of objects with which the operation interacts;

determining, based on the model, the identified operation types, and the identified objects with which the operations interact, a plurality of alternate operations, each alternate operation of the plurality of alternate operations corresponding to one or more original operations of the plurality of original operations, the plurality of alternate operations comprising an alternate security operation corresponding to the security operation, wherein each alternate operation is determined based on the identified type and set of objects associated with that original operation, and wherein each alternate operation comprises an alternate operation name and an alternate operation function; and generating, based on the plurality of original operations and the corresponding plurality of alternate operations, a mediation layer allowing instructions received through an alternate operation to be executed as an original operation, wherein the mediation layer comprises a two way mapping between the security operation and the alternate security operation, wherein the two way mapping includes a mapping of appropriate fields within a security header of the security operation to corresponding fields within a security header of the alternate security operation.

9. The non-transitory computer readable storage medium of claim 8, wherein an original operation comprises one or more inputs and one or more outputs and an alternate operation comprises one or more inputs, one or more outputs and an operation type.

10. The non-transitory computer readable storage medium of claim 9, wherein determining the plurality of alternate operations comprises:

determining, for each original operation of the plurality of original operations, a corresponding alternate operation based on the operation type and the inputs and outputs of the original operation;

detecting a plurality of the determined corresponding alternate operations comprising the same operation type and the same inputs and outputs; and consolidating the plurality of the determined corresponding alternate operations into a single alternate operation.

11. The non-transitory computer readable storage medium of claim 8, wherein the original service is associated with an original protocol outlining a method of interacting with the original service and the alternate service is associated with an alternate protocol distinct from the original protocol outlining a method of interacting with the alternate service.

12. The non-transitory computer readable storage medium of claim 11, wherein the original protocol is the Simple Object Access Protocol (SOAP) and the alternate protocol is the REpresentational State Transfer (REST) architectural style.

13. The non-transitory computer readable storage medium of claim 12, wherein the mediation layer comprises a mapping of values between a SOAP security header associated with the original protocol and a HTTP basic authorization header associated with the alternate protocol.

14. The non-transitory computer readable storage medium of claim 8, wherein the model for the original service comprises a tree model for each original operation of the original service and wherein the nodes of the tree model comprise nodes representing the operation name and inputs and outputs of the original operation.

\* \* \* \* \*